United States Patent [19] [11] 3,883,602
Ens [45] May 13, 1975

[54] PREPARATION AND ISOLATION OF CHLOROMETHYL METHYL ETHER BY SOLVENT EXTRACTION

[75] Inventor: Lawrence A. Ens, Ann Arbor, Mich.
[73] Assignee: The Dow Chemical Company, Midland, Mich.
[22] Filed: July 19, 1973
[21] Appl. No.: 380,776

[52] U.S. Cl. ............................ 260/614 R; 260/616
[51] Int. Cl. .................... C07c 41/00; C07c 41/12
[58] Field of Search ............................... 260/614

[56] References Cited
UNITED STATES PATENTS

| | | | |
|---|---|---|---|
| 2,652,432 | 9/1953 | Bauman et al. | 260/614 R |
| 2,667,516 | 1/1954 | Bauman et al. | 260/614 R |
| 2,681,939 | 6/1954 | Bauman et al. | 260/614 R |
| 2,916,522 | 12/1959 | McRae | 260/614 R |
| 3,086,060 | 4/1963 | Greer | 260/614 R |
| 3,356,735 | 12/1967 | Suzuki | 260/614 R X |

FOREIGN PATENTS OR APPLICATIONS
1,056,589  1/1967  United Kingdom............ 260/614 R

*Primary Examiner*—Howard T. Mars
*Attorney, Agent, or Firm*—David B. Kellom

[57] ABSTRACT

An improved process has been developed for preparing chloromethyl methyl ether containing very low concentrations of bis(chloromethyl)ether. Methylal is saturated with hydrogen chloride under essentially anhydrous conditions to form an equilibrium mixture of chloromethyl mehtyl ether, methyl, hydrogen chloride and methanol containing less than 5 ppm bis(-chloromethyl)ether. Then the chloromethyl methyl ether is recovered by selective solvent extraction, preferably with a liquid aliphatic hydrocarbon. Chloromethyl methyl ether thus prepared is used as an intermediate for preparing aromatic chloromethylated compounds.

7 Claims, No Drawings

PREPARATION AND ISOLATION OF CHLOROMETHYL METHYL ETHER BY SOLVENT EXTRACTION

BACKGROUND

Numerous methods for preparing chloromethyl methyl ether have been previously disclosed. Typically, the previous methods have involved the treating of a mixture of formaldehyde and methanol with hydrogen chloride, as shown in U.S. Pat. No. 2,667,516 by Bauman, et al. The same general reaction is disclosed in U.S. Pat. Nos. 2,652,432 and 2,681,939, both by Bauman, et al., wherein calcium chloride is added to the reaction vessel to form a solution with the water formed as a co-product. Another route followed by the prior art was the reacting of water and chlorosulfonic acid and contacting the resulting hydrogen chloride countercurrently with a mixture of methanol and formaldehyde, as taught in British Pat. No. 1,258,057.

All of these methods have resulted in the formation of appreciable quantities of highly toxic bis(chloromethyl)ether. Thus an improved method for preparing chloromethyl methyl ether in high yield while minimizing the formation of bis(chloromethyl)ether is highly desirable.

STATEMENT OF THE INVENTION

It has now been discovered that chloromethyl methyl ether can be prepared in good yields with very low concentrations of bis(chloromethyl)ether by (A) saturating methylal with hydrogen chloride under essentially anhydrous conditions to form an equilibrium mixture of chloromethyl methyl ether, methylal, hydrogen chloride and methanol, (B) extracting the equilibrium mixture with a selective liquid solvent, and thereafter (C) recovering the chloromethyl methyl ether from the liquid extractant. Preferably the liquid extractant is an aliphatic hydrocarbon which can be separated from the chloromethyl methyl ether by distillation. Chloromethyl methyl ether prepared by this process contains less than 5 ppm of bis(chloromethyl)ether.

GENERAL DESCRIPTION

The addition of dry hydrogen chloride to dry methylal produces an equilibrium mixture of chloromethyl methyl ether, methylal, hydrogen chloride and methanol as shown by Equation 1:

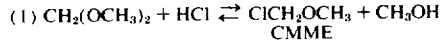

(1) $CH_2(OCH_3)_2 + HCl \rightleftarrows ClCH_2OCH_3 + CH_3OH$
　　　　　　　　　　　　　CMME The equilibrium composition of this mixture has been determined from −10° to 40°C with lower temperatures favoring conversion to chloromethyl methyl ether. Also, as long as the mixture is kept essentially free of water and formaldehyde, no detectable (<5 ppm) amount of bis(chloromethyl)ether is formed.

The favorable equilibrium and the very low concentration of bis(chloromethyl)ether make this an attractive process for manufacture of chloromethyl methyl ether. However, the high proportion of methanol present prevents the direct use of the equilibrium mixture for most chloromethylation processes. Separation of the chloromethyl methyl ether by distillation is not feasible because of the unfavorable physical and equilibrium characteristics of the system.

Certain solvents have now been found which permit the selective extraction of chloromethyl methyl ether from a mixture with methylal, hydrogen chloride and methanol. To be suitable for use in the present process, the extractant must be inert to the components of the mixture, and must have good solubility for chloromethyl methyl ether and limited solubility for methanol. Preferably, the methanol solubility in the extractant should be less than 5 g/100 g extractant at 20°C. Also, it is desirable that the extractant liquid have a boiling point sufficiently different from that of chloromethyl methyl ether to permit subsequent separation and recovery of the chloromethyl methyl ether and liquid extractant by distillation.

Particularly suitable for the selective extraction of chloromethyl methyl ether from the methylal-HCl mixture are liquid $C_6$–$C_{12}$ aliphatic hydrocarbons and mixtures thereof having a boiling point between about 65° to 225°C. Typical of such liquids are n-hexane, n-heptane, isooctane, 2,2,5-trimethylhexane, n-dodecane, and commercial $C_6$–$C_{12}$ paraffin fractions. Particularly effective are branched chain hydrocarbons such as a $C_8$–$C_9$ aliphatic hydrocarbon mixture having a boiling point range 118°–149°C and available from Phillips Petroleum Company as Soltrol 50.

In practice, the extraction is carried out by conventional batch or continuous methods. The extraction temperature is not critical although lower temperatures give slightly higher yields of chloromethyl methyl ether. The process is conveniently practiced at temperatures of from −10°C to 40°C, although higher or lower temperatures may be used.

The following examples illustrate further the present invention. Unless stated otherwise, all percentages are by weight. Chloromethyl methyl ether (CMME), bis(chloromethyl)ether, methanol, and methylal are analyzed by gas chromatography after reacting the chloromethyl ethers with a sodium alkoxide or phenate to form more stable derivatives and enhanced the sensitivity using standard chromatographic detectors as described in E. F. Ault and R. A. Solomon U.S. Pat. applications Ser. No. 303,123 filed Nov. 2, 1972 and Ser. No. 327,184 filed Jan. 26, 1973, and now abandoned. The lower level of detection for bis(chloromethyl)ether in liquid mixtures by this method is about 5 ppm.

EXAMPLE 1

228.3 Grams (3.0 g. moles) of dry methylal were placed in a reactor fitted with a stirrer, condenser and a hydrogen chloride sparge tube. Dry hydrogen chloride was then added at a rate of 3 g moles/hr for 70 minutes to the methylal which was maintained at 20°C during the addition. The addition rate was then reduced to 1.5 g moles/hr for the next 50 minutes. Then 170 ml of Soltrol 50 ($C_8$–$C_9$ branched chain paraffin fraction from Phillips Petroleum Co., b.p. 118°–149°C) were added to the reaction mixture and the mixture was stirred for 10 minutes. After being allowed to settle for 5 minutes, the Soltrol 50 layer (250 ml; 184.5 g) was separated and distilled using a 16-plate column. Four fractions were collected and analyzed. The pertinent data are given in Table I. The combined distillate containing 81% chloromethyl methyl ether (CMME), 16.8% methylal, 0.1% methanol, 1.3% HCl and 0.9% paraffin is suitable for chloromethylation of polystyrene and other aromatic hydrocarbons. The concentration of bis(chloromethyl)ether in the distillate was less than 5 ppm.

Table I

Recovery of Chloromethyl Methyl Ether from Extract Raffinate
Wt. Percent

| Fraction No. | Boiling Range, °C. | Wt., g. | Chloromethyl Methyl Ether | Methylal | Methanol | HCl | Soltrol 50 |
|---|---|---|---|---|---|---|---|
| 1 | 43–55 | 15.7 | 55.8 | 40.1 | 0.9 | 2.8 | 0.5 |
| 2 | 55–57 | 14.3 | 75.5 | 22.3 | 0.0 | 1.6 | 0.7 |
| 3 | 57–59 | 31.3 | 89.2 | 9.1 | 0.0 | 0.8 | 1.0 |
| 4 | 59–60 | 14.4 | 94.5 | 2.7 | 0.0 | 1.3 | 1.5 |
| Residue | >60 | 93.3 | 2.0 | 0.1 | 0.0 | 0.3 | 97.6 |

EXAMPLE 2

Using the same apparatus in Example 1, 275 ml. (3.0 g.-moles) of dry methylal were saturated with dry hydrogen chloride at 20°C. Then 70 ml Soltrol 50 was added to form a distinct upper layer. After shaking the layers were allowed to separate and samples from both layers were withdrawn for analysis. Two additional 50 ml portions of Soltrol 50 were added with mixing, settling, and sampling after each addition. The data in Table II show the effective extraction of chloromethyl methyl ether essentially free of methanol from the methylal-HCl equilibrium mixture.

Table II

Phase Compositions - Paraffin Extractant

| Total Soltrol 50 Added (ml) | Phase Vol (ml): Upper/Lower | Phase Composition (Wt %): Upper[b]/Lower | | | | |
|---|---|---|---|---|---|---|
| | | CMME | Methylal | Methanol | HCl | Soltrol 50 |
| 0 | 375[a] ml | 30.5% | 24.3% | 18.5% | 24.6% | 0 |
| 70 ml | 60/390 | 36.1/22.5 | 2.8/19.1 | 0.1/15.4 | 4.2/33.0 | 56.8/10.0 |
| 120 ml | 160/340 | 82.7/18.7 | 3.3/19.3 | 0.0/20.2 | 3.1/34.9 | 60.9/6.9 |
| 170 ml | 250/300 | 28.5/16.6 | 3.1/16.8 | 0.0/22.5 | 2.7/37.8 | 65.7/6.3 |

[a] Single phase equilibrium mixture
[b] Less than 5 ppm bis(chloromethyl)ether

EXAMPLE 3

Using the same apparatus and conditions as in Example 2, dry methylal was saturated with dry hydrogen chloride. To each of three 35-ml portions of the reaction mixture was added 15 ml of an aliphatic hydrocarbon solvent, and the resulting mixture shaken vigorously and analyzed. The results are given in Table III.

Table III $C_6$–$C_{12}$ Hydrocarbon Extractants

| Solvent | Phase Volume Upper/Lower | Upper Phase Composition (Wt %)[a] | | |
|---|---|---|---|---|
| | | CMME | Methylal | Methanol |
| Soltrol 50 | 23/27 ml | 47.6% | 4.8% | 0.9 |
| Isooctane | 24/26 ml | 43.7% | 5.0% | 0.9 |
| n-Heptane | 23/27 ml | 41.1% | 6.8% | 10.7 |

[a] Less than 5 ppm bis(chloromethyl)ether.

I claim:

1. A process for preparing chloromethyl methyl ether containing less than 5 ppm of bis(chloromethyl) ether comprising:
   A. Saturating methylal with hydrogen chloride under essentially anhydrous conditions to form an equilibrium mixture of chloromethyl methyl ether, methylal, hydrogen chloride and methanol;
   B. Selectively extracting the chloromethyl ether from the equilibrium mixture at a temperature of from −10° to 40°C with an inert liquid $C_6$–$C_{12}$ aliphatic hydrocarbon having a boiling point between about 65° to 225°C and a limited solubility for methanol of less than 5 g/100 g liquid extractant at 20°C; and
   C. Recovering chloromethyl methyl ether from the extractant liquid.

2. A process as in claim 1 wherein the aliphatic hydrocarbon is a branched chain paraffin.

3. A process as in claim 1 wherein the aliphatic hydrocarbon is isooctane.

4. A process as in claim 1 wherein the aliphatic hydrocarbon is n-heptane.

5. A process as in claim 1 wherein the aliphatic hydrocarbon is a branched chain $C_8$–$C_9$ paraffin mixture.

6. A process for the recovery of chloromethyl methyl ether containing less than 5 ppm of bis(chloromethyl)ether from an essentially anhydrous mixture of chloromethyl methyl ether, methanol, methylal and hydrogen chloride which comprises selectively extracting the chloromethyl methyl ether at a temperature of from −10° to 40°C with an inert liquid $C_6$–$C_{12}$ aliphatic hydrocarbon having a boiling point between about 65° to 225°C, and thereafter distilling the extract raffinate to recover the chloromethyl methyl ether.

7. The process of claim 6 wherein the inert liquid is a branched chain $C_6$–$C_{12}$ aliphatic hydrocarbon.

* * * * *